US007385601B2

(12) United States Patent
Bingham et al.

(10) Patent No.: US 7,385,601 B2
(45) Date of Patent: Jun. 10, 2008

(54) SYSTEMS AND METHODS OF GENERATING INTEGRATED GARMENT-MODEL SIMULATIONS

(75) Inventors: Geoff Bingham, Warwickshire (GB); Martin Bentham, Barnsley (GB); David Bruner, Cary, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 239 days.

(21) Appl. No.: 11/152,899

(22) Filed: Jun. 15, 2005

(65) Prior Publication Data

US 2005/0283267 A1  Dec. 22, 2005

(51) Int. Cl.
*G06T 17/00* (2006.01)
(52) U.S. Cl. .................... 345/420; 345/419; 345/629; 700/98; 700/132
(58) Field of Classification Search ............. 345/420, 345/419, 629; 700/132, 98
See application file for complete search history.

(56) References Cited

U.S. PATENT DOCUMENTS

| 4,127,128 | A | 11/1978 | Schmidt ..................... 450/1 |
| 6,220,924 | B1 | 4/2001 | Kobayashi et al. ............ 450/9 |
| 6,509,899 | B1 | 1/2003 | Anderson .................. 345/473 |
| 6,810,300 | B1 * | 10/2004 | Woltman et al. ............ 700/132 |
| 6,907,310 | B2 * | 6/2005 | Gardner et al. ............. 700/132 |
| 6,909,431 | B1 | 6/2005 | Anderson et al. ........... 345/473 |
| 2005/0267614 | A1 | 12/2005 | Looney et al. ................ 700/98 |

OTHER PUBLICATIONS

Volino et al. "*The Evolution of a 3D System for Simulating Deformable Clothes on Virtual Actors*", MIRALab, University of Geneva, 1998, 21 Pgs.
Volino et al. "*An Evolving System Clothes on Virtual Actors*", IEEE Sep. 1996, pp. 42-51.
Cugini et al. "*3D Design and Simulation of Men Garments*", Proceedings of Workshop, 2002, 8 Pgs.
Volino et al. "*Versatile and Efficient Techniques for Simulating Cloth and Other Deformable Objects*", ACM Press, New York, NY, 1995, pp. 137-144.

* cited by examiner

*Primary Examiner*—Kimbinh T Nguyen
(74) *Attorney, Agent, or Firm*—Womble Carlyle Sandridge & Rice, PLLC

(57) ABSTRACT

A method for generating an integrated garment-model simulation is provided. The method includes scanning a human fit model to acquire first shape data representative of a portion of the human fit model; defining a three-dimensional surface simulation based on the first shape data; combining the surface simulation with medical data to define a model simulation; acquiring second shape data and material property data representative of a sample garment; defining a garment simulation based on the second shape data and the material property data; and combining the garment simulation with the model simulation to generate the integrated garment-model simulation.

16 Claims, 1 Drawing Sheet

SYSTEMS AND METHODS OF GENERATING INTEGRATED GARMENT-MODEL SIMULATIONS

BACKGROUND OF THE INVENTION

1. Field of the Invention

The present invention relates to computer simulations of a garment and a model. More particularly, the present invention relates to systems and methods for generating integrated garment-model simulations.

2. Description of Related Art

Human models are used in the design of garments to test the fit, comfort, aesthetics, and other attributes of the garment-model system. Typically, the human model and designer evaluate these attributes using a trial-and-error process. Here, the designer prepares a first sample garment, which is then worn by the human model. These human models are often referred to as "fit models". Fit models are persons having a predetermined body size and/or shape, which approximates the target wearer of the garment.

The fit model and designer then subjectively determine whether the first sample garment is acceptable as compared to predetermined design and analysis criteria. Any deficiencies in this subjective determination are noted, and a second sample garment is prepared to correct the noted deficiencies.

The trial-and-error process continues until the subjective analysis by the fit model and designer determine that the sample garment is acceptable, a process which is known to require five or more iterations. Thus, the trial-and-error process is generally inefficient and costly. Further, the trial-and-error process is subjective to the particular fit model(s) and designer and is therefore based on two opinions, namely the designer and the fit model.

Moreover, body shape and size of the fit models, as with most people, can change in shape and size on a day-to-day basis. Thus, the trial-and-error process is made even less accurate by the variability in the shape and size of the fit model.

Accordingly, it has been determined that there is a need for computer integrated garment-model simulations, as well as systems and methods for generating such simulations, that overcome, mitigate, and/or eliminate one or more of the aforementioned deleterious effects of the prior art.

BRIEF SUMMARY OF THE INVENTION

It is an object of the present invention to provide systems and methods for generating integrated garment-model simulations.

It is another object of the present invention to provide systems and methods that generate integrated garment-model simulations from measured data.

These and other objects and advantages of the present invention are provided by a method for generating an integrated garment-model simulation. The method includes scanning a human fit model to acquire first shape data representative of a portion of the human fit model; defining a three-dimensional surface simulation based on the first shape data; combining the surface simulation with medical data to define a model simulation; acquiring second shape data and material property data representative of a sample garment; defining a garment simulation based on the second shape data and the material property data; and combining the garment simulation with the model simulation to generate the integrated garment-model simulation.

The present invention also provides a system for generating an integrated garment-model simulation. The system includes a model definition process, a garment definition process, and an integration process. The model definition process generates a model simulation based on scan data from a human fit model. The garment definition process generates a garment simulation based on a sample garment. The integration process integrates the model simulation and the garment simulation to generate the integrated garment-model simulation.

The above-described and other features and advantages of the present invention will be appreciated and understood by those skilled in the art from the following detailed description, drawings, and appended claims.

DETAILED DESCRIPTION OF THE INVENTION

Figure 1:
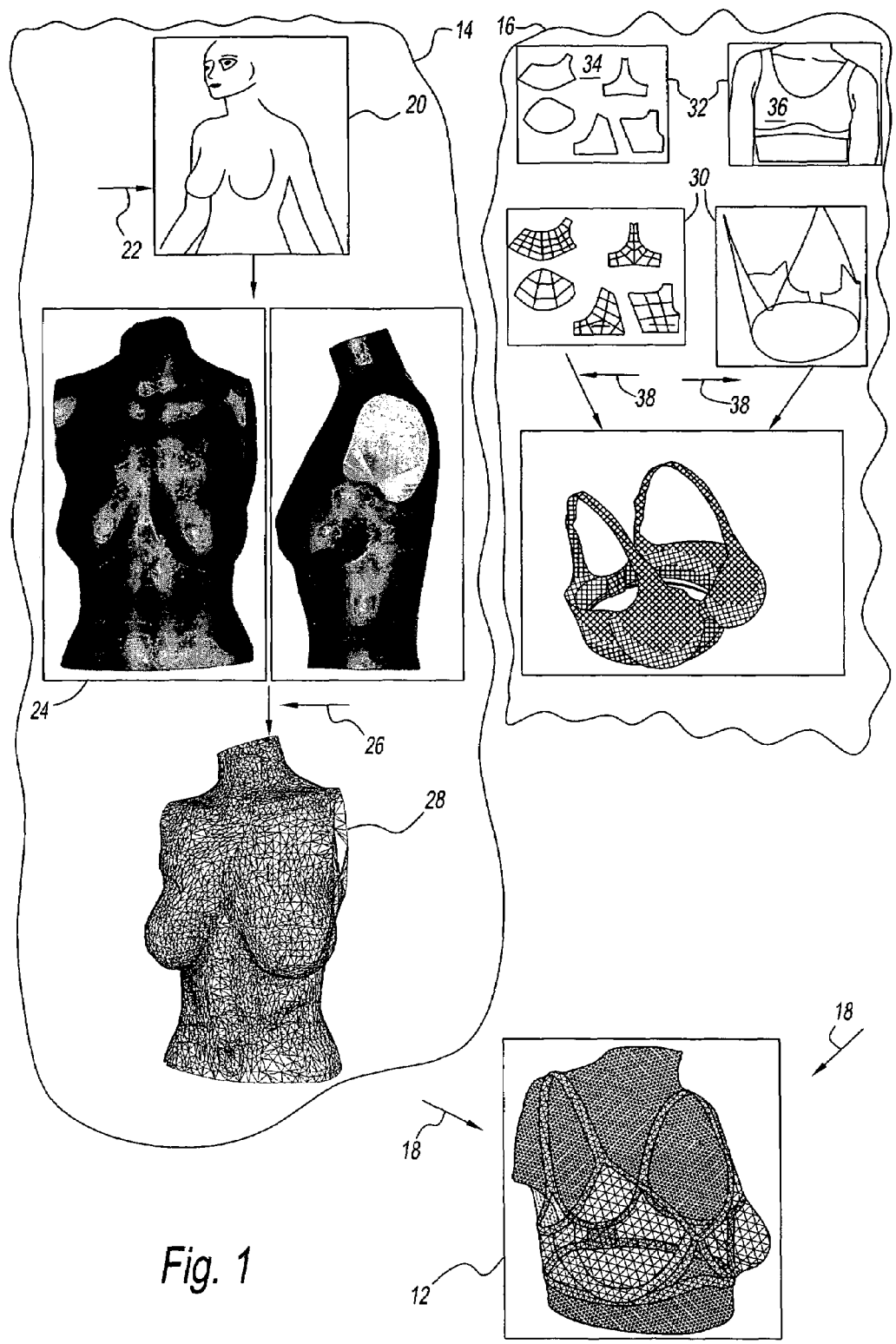
FIG. 1 is a schematic depiction of an exemplary embodiment of a method for generating an integrated garment-model simulation.

Referring to the drawing, namely to FIG. 1, a method for generating an integrated garment-model simulation according to the present invention is generally represented by reference numeral 10. Method 10 generates an integrated garment-model simulation 12. Method 10 has a model definition process 14, a garment definition process 16, and an integration process 18 that act to generate simulation 12.

Integrated garment-model simulation 12 has been found to be useful in analysis of the fit, comfort, aesthetic, and other physical and/or qualitative attributes for garment design. For example, integrated garment-model simulation 12 can be used with a finite element analysis (FEA) program, such as, but not limited to ANSYS commercially available from Ansys Incorporated of Canonsburg, Pa., to determine stress, deflection, heat flow, and other physical and/or qualitative attributes of the garment-model simulation.

Model definition process 14 acquires first shape data 20 using a scanning process 22. First shape data 20 represents the shape of a portion or portions of a human fit model (not shown). For example, first shape data 20 is illustrated in FIG. 1 representing the upper torso of a female fit model.

It is contemplated by the present invention for first shape data 20 to be representative of other portions of the fit model. For example, it is contemplated for first shape data 20 to be representative of regions such as, but not limited to, the lower torso, the leg, the arm, the hand, the foot, the head, and other body regions.

It is also contemplated by the present invention for first shape data 20 to be a combination of data from a number or plurality of fit models. For example, scanning process 22 can be used to collect shape data from a predetermined number of fit models. Model definition process 14 determines first shape data 20 based on this plurality of scanned data. For example, model definition process 14 can determine first shape data from the plurality of scanned data using statistical analysis such as, but not limited to, averages, standard deviations, and others.

In addition, it is also contemplated by the present invention for first shape data 20 to be a combination of shape data from the same fit model taken at different times. For example, scanning process 22 can be used to collect shape data from one particular fit model over successive days.

Thus, model definition process 14 can determine first shape data 20 based on this plurality of scanned data.

Scanning process 22 uses a three-dimensional body scanner or imaging system. For example, scanning process 22 can use a three-dimensional body scanner such as that available from [TC]² of Cary, N.C. or that available from Cyberware of Monteray, Calif. Of course, it is contemplated for scanning process 22 to acquire first shape data 20 using other imaging systems, such as, but not limited to, one or more x-ray devices, magnetic imagining devices, and other such imaging systems.

Advantageously, model definition process 14 acquires first shape data 20 as static data. Namely, first shape data 20, once acquired by model definition process 14, does not change. Accordingly, method 10 can be more accurate and repeatable than prior trial-and-error processes, which use the constantly varying shape of the fit model.

Model definition process 14 constructs a surface simulation 24 from first shape data 20. Surface simulation 24 is a three-dimensional computer simulation of first shape data 20.

Model definition process 14 combines surface simulation 24 with medical data 26 to define a model simulation 28. Medical data 26 is data related to the stiffness, thickness and other properties of underlying bone and tissue structures of the scanned body portion. For example, the medical data can include the thickness and/or stiffness of skin, muscle, fat, bone, or any combinations thereof.

In this manner, model definition process 14 defines model simulation 28 from measured first shape data 20 and known medical data on the relevant represented portions of the body. Thus, model simulation 28 is a computer-generated simulation of the human fit model or models.

Garment definition process 16 acquires second shape data 30 representative of a sample garment 32. Sample garment 32 can be a traditional cut-and-sew garment 34, a circular knit garment 36, or any combinations thereof. In a preferred embodiment, sample garment 32 aids in supporting and/or shaping a portion of the body.

Second shape data 30 is a digital simulation of the shape of garment 32. Second shape data 30 can be acquire from computer aided drafting programs, two-dimensional scanned information, circular knitting patterns, or any combinations thereof.

For the example shown in FIG. 1, second shape data 30 represents a brassiere for supporting the upper torso of a female fit model.

Garment definition process 16 combines second shape data 30 with material property data 38 to define a garment simulation 40. Material property data 38 can include the fabric thickness, the fabric stiffness, the knit structure, the yarn type, the presence or absence of a structural element (e.g., an underwire), or any combinations thereof.

The stiffness characteristics of fabric is based on different types of yarn combinations in various knit structures. This stiffness can be determined by computer simulation, such as FEA, and/or physical testing. Additionally, empirical models of physical properties can be made based on a matrix of physical testing results.

Thus, garment definition process 16 can be completed without the need for the production of physical sample garments. Rather, multiple sample garments 32 can be easily and rapidly defined by garment definition process 16.

Integration process 18 integrates garment simulation 28 and model simulation 40 to define integrated garment-model simulation 12. Thus, the integrated garment-model simulation 12 is a computer-generated simulation of the human fit model(s) as measured by scanning process 22 wearing sample garment 32. It has been found that method 10 generates a more accurate, repeatable, and qualitative system for the evaluation of garment designs. Namely, it has been found that integrated garment-model simulation 12 based on measured body data (i.e., first shape data 20), medical data 26, the digital simulation of the shape of sample garment 32 (i.e., second shape data 30), and material property data 38 is more accurate, repeatable, and quicker than the prior trial-and-error processes.

Integrated garment-model simulation 12 is described above by way of example with respect to model simulation 28 as an upper torso and garment simulation 40 as a brassiere. Of course, it is contemplated by the present invention for method 10 to integrate any model and garment simulations 28, 40, respectively.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the scope thereof. Therefore, it is intended that the present invention not be limited to the particular embodiment(s) disclosed as the best mode contemplated, but that the invention will include all embodiments falling within the scope of the appended claims.

What is claimed is:

1. A method for generating an integrated garment-model simulation, comprising:
   scanning a human fit model to acquire first shape data representative of a portion of said human fit model;
   defining a three-dimensional surface simulation based on said first shape data;
   combining said three-dimensional surface simulation with medical data to define a model simulation;
   acquiring second shape data and textile structural data, said second shape data representative of a sample garment;
   defining a garment simulation based on said second shape data and said textile structural data; and
   combining said garment simulation with said model simulation to generate the integrated garment-model simulation.

2. The method as in claim 1, wherein said medical data comprises data is selected from the group consisting of thickness of skin, stiffness of skin, thickness of muscle, stiffness of muscle, thickness of fat, stiffness of fat, thickness of bone, stiffness of bone, and any combinations thereof.

3. The method as in claim 1, wherein said portion is selected from the group consisting of an upper torso, a lower torso, a leg, an arm, a hand, a foot, a head, and any combinations thereof.

4. The method as in claim 1, further comprising: scanning a plurality of human fit models to collect individual data from each of said plurality of human fit models; and, determining said first shape data from said individual data.

5. The method as in claim 1, further comprising:
   scanning said human fit model a plurality of times to collect data points from said human fit model; and,
   determining said first shape data from said data points.

6. The method as in claim 1, wherein said first shape data comprises static data.

7. The method as in claim 1, wherein said sample garment is selected from the group consisting of a cut-and-sew garment, a circular knit garment, and any combinations thereof.

8. The method as in claim 1, wherein said textile structural data is selected from the group consisting of fabric thickness, fabric stiffness, knit structure, yarn type, presence or absence of a structural element, and any combinations thereof.

9. A system for generating an integrated garment-model simulation, comprising:
   a model definition process for generating a model simulation based on scanned data from a human fit model comprising a three dimensional surface simulation based on a first shape data and medical data;
   a garment definition process for generating a garment simulation based on a sample garment comprising textile structural data and second shape data representative of the sample garment; and
   an integration process for integrating said model simulation and said garment simulation to generate the integrated garment-model simulation.

10. The system as in claim 9, wherein said model definition process generates said model simulation based on data selected from the group consisting of thickness of skin, stiffness of skin, thickness of muscle, stiffness of muscle, thickness of fat, stiffness of fat, thickness of bone, stiffness of bone, and any combinations thereof.

11. The system as in claim 9, wherein said scan data is from a plurality of human fit models.

12. The system as in claim 9, wherein said scan data is from a plurality of scans of said human fit model.

13. The system as in claim 9, wherein said sample garment is selected from the group consisting of a cut-and-sew garment, a circular knit garment, and any combinations thereof.

14. The system as in claim 9, wherein said garment definition process generates said garment simulation based on textile structural data, said garment simulation representative of said sample garment.

15. The system as in claim 14, wherein said textile structural data is selected from the group consisting of fabric thickness, fabric stiffness, knit structure, yarn type, presence or absence of a structural element, and any combinations thereof.

16. A method for generating an integrated garment-model simulation, comprising:
   defining a human model simulation based on a scanned portion of at least one human fit model and known medical data of said scanned portion;
   defining a garment simulation based on second shape data and textile structural data, said garment simulation representative of a sample garment; and
   combining said garment simulation with said human model simulation to generate the integrated garment-model simulation.

\* \* \* \* \*